US012328671B2

(12) United States Patent
Xu

(10) Patent No.: US 12,328,671 B2
(45) Date of Patent: Jun. 10, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 379 days.

(21) Appl. No.: 17/678,607

(22) Filed: Feb. 23, 2022

(65) Prior Publication Data

US 2022/0191790 A1 Jun. 16, 2022

Related U.S. Application Data

(63) Continuation of application No. PCT/CN2019/114802, filed on Oct. 31, 2019.

(51) Int. Cl.
*H04W 52/02* (2009.01)
*H04L 5/00* (2006.01)
(Continued)

(52) U.S. Cl.
CPC ... *H04W 52/0216* (2013.01); *H04W 52/0232* (2013.01); *H04W 72/044* (2013.01); *H04W 72/1263* (2013.01)

(58) Field of Classification Search
CPC ......... H04W 52/0216; H04W 52/0232; H04W 72/044; H04W 72/1263
See application file for complete search history.

(56) References Cited

U.S. PATENT DOCUMENTS

| 2019/0254110 A1* | 8/2019 | He ......................... H04L 5/0048 |
| 2020/0092073 A1* | 3/2020 | Papasakellariou .... H04L 5/0053 |

(Continued)

FOREIGN PATENT DOCUMENTS

| CN | 102484855 A | 5/2012 |
| CN | 102870365 A | 1/2013 |

(Continued)

OTHER PUBLICATIONS

Ericsson (R1-1911653, "Summary #5 of efficient and low latency serving cell configuration/activation/setup", 3GPP TSG RAN WG1 Meeting #98bis, Chongqing, China, Oct. 14-18, 2019) (Year: 2019).*

(Continued)

*Primary Examiner* — Xuan Lu
(74) *Attorney, Agent, or Firm* — BAYES PLLC

(57) ABSTRACT

Embodiments of the present application provide a wireless communication method, a terminal device, and a network device. When the terminal device is in a DRX activate time, a dormancy state and a non-dormancy state are distinctively indicated for different secondary carriers. The wireless communication method includes: the terminal device receives first control information on a primary carrier; the terminal device determines, according to whether the first control information carries scheduling information for scheduling data transmission on a target carrier, first indication information carried in the first control information, the first indication information being used for indicating the state of at least one secondary carrier, and the state of a carrier including a dormancy state and a non-dormancy state; and the terminal device determines the state of at least one secondary carrier according to the first indication information.

11 Claims, 5 Drawing Sheets

(51) Int. Cl.

| | | |
|---|---|---|
| *H04W 24/10* | (2009.01) | |
| *H04W 72/044* | (2023.01) | |
| *H04W 72/1263* | (2023.01) | |
| *H04W 72/23* | (2023.01) | |
| *H04W 76/15* | (2018.01) | |
| *H04W 76/27* | (2018.01) | |

(56) References Cited

U.S. PATENT DOCUMENTS

| | | | | |
|---|---|---|---|---|
| 2021/0029772 | A1* | 1/2021 | Islam | H04L 1/1896 |
| 2022/0116923 | A1* | 4/2022 | Kim | H04L 5/0098 |

FOREIGN PATENT DOCUMENTS

| | | | |
|---|---|---|---|
| CN | 105917607 | A | 8/2016 |
| CN | 105940651 | A | 9/2016 |
| CN | 109788558 | A | 5/2019 |
| WO | 2016/152005 | A1 | 9/2016 |
| WO | 2019052538 | A1 | 3/2019 |

OTHER PUBLICATIONS

Second Office Action issued in corresponding Chinese application No. 202111667813.2, mailed Jun. 12, 2023.
Second Office Action issued in corresponding European application No. 19950276.6, mailed Aug. 31, 2023.
Notice of Reasons for Refusal issued in corresponding Japanese Application No. 2022-516446, mailed on Oct. 6, 2023, 7 pages.
Notification to Grant Patent Right for Invention issued in corresponding Chinese Application No. 202111667813.2, mailed on Sep. 27, 2023, 3 pages.
"Efficient CA design", Agenda item: 7.2.13.3, Source: Nokia, Nokia Shanghai Bell, 3GPP TSG RAN WG1 Meeting RAN1#98bis R1-1910604, Chongqing, China, Oct. 14-20, 2019, 5 pages.
"Efficient and low latency SCell data transmission for NR CA", Agenda item: 7.2.13.3, Source: MediaTek Inc., 3GPP TSG RAN WG1 Meeting RAN1 #98-Bis R1-1911436, Chongqing, China, Oct. 14-20, 2019, 16 pages.
First Office Action issued in corresponding European application No. 19950276.6, mailed Feb. 24, 2023.
First Office Action issued in corresponding Chinese application No. 202111667813.2, mailed Mar. 8, 2023.
Intel Corporation, "Discussion on fast SCell activation and deactivation", R1-1910682, 3GPP TSG RAN WG1 Meeting #98bis Chongqing, China, Oct. 14-20, 2019.
Futurewei, "On efficient and low latency low power serving cell operations", R1-1910918, 3GPP TSG RAN WG1 Meeting #98bis Chongqing, China, Oct. 14-18, 2019.
ZTE, "Discussion on Potential Techniques for UE Power Saving", R1-1910184, 3GPP TSG RAN WG1 #98bis Chongqing, China, Oct. 14-20, 2019.
Ericsson, "Summary #5 of efficient and low latency serving cell configuration/activation/setup", R1-1911653, 3GPP TSG RAN WG1 Meeting #98bis Chongqing, China, Oct. 14-18, 2019.
Request for CNIPA Patent Priority Review issued in corresponding Chinese application No. 202111667813.2, mailed Nov. 25, 2022.
International Search Report issued in corresponding International Application No. PCT/CN2019/114802, mailed Jul. 22, 2020, 29 pages.
Written Opinion of the International Searching Authority issued in corresponding International Application No. PCT/CN2019/114802, mailed Jul. 22, 2020, 9 pages.
"Discussion on low latency SCell activation and efficient SCell management", Agenda Item: 7.2.13.3, Source: Huawei, HiSilicon, 3GPP TSG RAN WG1 Meeting #98bis R1-1910039, Chongqing, China, Oct. 14-20, 2019, 19 pages.
"Open issues on SCell fast activation and deactivation", Agenda Item: 7.2.13.3, Source: ASUSTeK, 3GPP TSG RAN WG1 #98bis R1-190xxxx, Chongqing, China, Oct. 14-20, 2019, 3 pages.
"Reduced latency Scell management for NR CA", Agenda Item: 7.2.13.3, Source: Ericsson, 3GPP TSG-RAN WG1 #98bis R1-1911015, Chongqing, China, Oct. 14-20, 2019, 9 pages.
"Fast SCell Activation and SCell Dormancy", Agenda item: 7.2.13. 3, Source: Qualcomm Incorporated, 3GPP TSG-RAN WG1 #98bis, R1-1911139, Chongqing, China, Oct. 14-20, 2019, 18 pages.
"Discussion on PDCCH-based power saving channel", Agenda Item: 7.2.9.1, Source: Spreadtrum Communications, 3GPP TSG RAN WG1 Meeting #98bis, R1-1910013, Chongqing, China, Oct. 14-20, 2019, 16 pages.
Extended European Search Report issued in corresponding European application No. 19950276.6, mailed Jun. 24, 2022.
First Office Action issued in corresponding Indian application No. 202217010200, mailed Jul. 5, 2022.
Qualcomm Incorporated, "Fast SCG and SCell Activation", R1-1907306, 3GPP TSG-RAN WG1 #97 Reno, USA, May 13-17, 2019.
Notice of Allowance issued in corresponding Vietnamese Application No. 1-2022-01867, dated Oct. 14, 2024, 2 pages.
Hearing Notice in Reference of India Application No. 202217010200, dated Dec. 4, 2024, 3 pages.

* cited by examiner

WIRELESS COMMUNICATION METHOD, TERMINAL DEVICE, AND NETWORK DEVICE

CROSS-REFERENCE TO RELATED APPLICATION

This application is a continuation of International Patent Application No. PCT/CN2019/114802 filed Oct. 31, 2019, entitled "WIRELESS COMMUNICATION METHOD, TERMINAL DEVICE, AND NETWORK DEVICE", the contents of which are incorporated herein by reference in its entirety.

TECHNICAL FIELD

Embodiments of the present disclosure relate to the field of communication, and more particularly, to a wireless communication method, a terminal device, and a network device.

BACKGROUND

Discontinuous reception (DRX) is introduced under the consideration of power saving of terminal devices. During the DRX active time, the terminal device monitors and receives a physical downlink control channel (PDCCH), and during the DRX inactive time, the terminal device does not monitor the PDCCH to reduce power consumption. In the fifth-generation New Radio technologies (5G NR), a dormancy state is introduced in order to further realize energy saving of terminal devices. During the active time of the DRX, carriers can be configured to be in the dormancy state in which the terminal device can ignore the PDCCH of one carrier or greatly reduce the PDCCH monitoring on one carrier. Meanwhile, the terminal device only needs to maintain the reception of some basic channel measurement signals, such as uplink and downlink synchronization, frequency calibration, etc.

SUMMARY

Embodiments of the present application provide a wireless communication method, a terminal device, and a network device. When the terminal device is in a DRX active time, a dormancy state or a non-dormancy state is distinctively indicated for different secondary carriers.

In a first aspect, there is provided a wireless communication method, including:
receiving, by a terminal device, first control information on a primary carrier;
determining, by the terminal device, first indication information carried in the first control information according to whether the first control information carries scheduling information for scheduling data transmission on a target carrier, and the first indication information is used for indicating a state of at least one secondary carrier, and states of a carrier include a dormancy state and a non-dormancy state; and
determining, by the terminal device, the state of the at least one secondary carrier according to the first indication information.

In a second aspect, there is provided a wireless communication method, including:
determining, by a network device, first indication information carried in first control information according to whether the first control information carries scheduling information for scheduling data transmission on a target carrier, and the first indication information is used for indicating a state of at least one secondary carrier, and states of a carrier include a dormancy state and a non-dormancy state; and
sending, by the network device, the first control information on a primary carrier.

In a third aspect, there is provided a terminal device, configured to perform the method in the first aspect or any of the implementations thereof.

Specifically, the terminal device includes functional modules configured to perform the method in the first aspect or any of the implementations thereof.

In a fourth aspect, there is provided a network device, configured to perform the method in the second aspect or any of the implementations thereof.

Specifically, the network device includes functional modules configured to perform the method in the second aspect or any of the implementations thereof In a fifth aspect, there is provided a terminal device, including a processor and a memory. The memory is configured to store a computer program, and the processor is configured to call and run the computer program stored in the memory to execute the method in the first aspect or any of the implementations thereof.

In a sixth aspect, there is provided a network device, including a processor and a memory. The memory is configured to store a computer program, and the processor is configured to call and run the computer program stored in the memory to execute the method in the second aspect or any of the implementations thereof.

In a seventh aspect, there is provided a device, configured to perform the method in any one of the first to second aspects or any of the implementations thereof.

Specifically, the device includes: a processor, configured to call and run a computer program from a memory, so that an apparatus installed with the device performs the method in any one of the first to second aspects or any of the implementations thereof.

In an eighth aspect, there is provided a computer-readable storage medium, configured to store a computer program that causes a computer to perform the method in any one of the first to second aspects or any of the implementations thereof.

In a ninth aspect, there is provided a computer program product, including computer program instructions, which cause the computer to perform the method in any one of the first to second aspects or any of the implementations thereof.

In a tenth aspect, there is provided a computer program which, when run on a computer, causes the computer to perform the method in any one of the first to second aspects or any of the implementations thereof.

DETAILED DESCRIPTION

The technical solutions in the embodiments of the present application will be described below with reference to the accompanying drawings in the embodiments of the present application. Obviously, the described embodiments are part of the embodiments of the present application, but not all of the embodiments. For the embodiments in the present application, all other embodiments obtained by those skilled in the art without creative efforts shall fall within the protection scope of the present application Embodiments of the present disclosure may be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced. Long Term Evolution (LTE-A) system, a New Radio (NR) system, an NR system evolution system, a LTE-based access to unlicensed spectrum (LTE-U) system, an NR-based access to unlicensed spectrum (NR-U) system, a Universal Mobile Telecommunications System (UMTS), a Wireless Local Area Network (WLAN), Wireless Fidelity (WiFi), a next generation communication system, or other communication systems Generally speaking, the number of connections supported by a traditional communication system is limited and easy to implement. However, with development of the communication technology, mobile communication systems will not only support traditional communication, but also support, for example, Device to Device (D2D) communication, Machine to Machine (M2M) communication, Machine Type Communication (MTC), or Vehicle to Vehicle (V2V) communication. The embodiments of the present disclosure may also be applied to such communication systems.

In one implementation, the communication system in the embodiments of the present disclosure may be applied to a Carrier Aggregation (CA) scenario, a Dual Connectivity (DC) scenario, or a Standalone (SA) scenario.

The spectrum to which the embodiments of the present disclosure are applied is not limited. For example, the embodiments of the present disclosure may be applied to a licensed spectrum, or an unlicensed spectrum.

Figure 1:
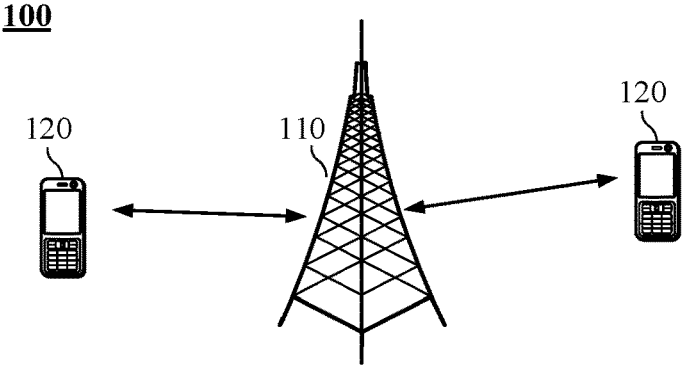
FIG. 1 is a schematic diagram illustrating a communication system architecture provided by an embodiment of the present application.

In one implementation, a communication system 100 to which embodiments the present disclosure are applied is shown in FIG. 1. The communication system 100 may include a network device 110 that may be a device communicating with a terminal device 120 (or referred to as a communication terminal, or a terminal). The network device 110 may provide communication coverage for a specific geographical area, and may communicate with terminal devices located within the coverage area.

In one implementation, FIG. 1 illustrates one network device and two terminal devices. In one implementation, the communication system 100 may include multiple network devices, and the number of terminal devices included within the coverage area of each network device may not be two, which is not limited in embodiments of the present disclosure.

In one implementation, the communication system 100 may include other network entities such as a network controller, and a mobile management entity, which is not limited in embodiments of the present disclosure.

It should be understood that, a device with a communication function in a network/system in the embodiments of the present disclosure may be referred to as a communication device.

For example, as for the communication system 100 shown in FIG. 1, the communication device may include the network device 110 and the terminal device 120 which have communication functions, and the network device 110 and the terminal device 120 may be the specific devices described above, which will not be described herein again. The communication device may also include other devices in the communication system 100, such as the network controller, the mobile management entity, and other network entities, which is not limited in the embodiments of the present disclosure.

It should be understood that the terms "system" and "network" herein may often be interchanged herein. The term "and/or" herein is only an association relationship that describes associated objects, and represents that there may be three relationships.

For example, A and/or B may represent that: A exists alone, A and B exist simultaneously, and B exists alone. In addition, the character "/" herein generally indicates that front and back associated objects are in an "or" relationship.

The embodiments of the present disclosure describe various implementations in combination with a terminal device and a network device. Herein the terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc. The terminal device may be a station (ST) in the WLAN, or may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing devices connected to a wireless modem, a vehicle-mounted device, a wearable device, or a terminal device in a next generation communication system such as a terminal device in an NR network or a terminal device in a future evolved Public Land Mobile Network (PLMN).

By way of example and not limitation, in the embodiments of the present disclosure, the terminal device may be a wearable device. The wearable device may also be called a wearable intelligent device, which is a general term of wearable devices designed intelligently and developed on daily wear using wearable technology, such as glasses, gloves, a watch, clothing and shoes. The wearable device is a portable device that is worn directly on a body or integrated into a user's clothes or accessories. The wearable device not only is a hardware device, but also implements powerful functions through software support, data interaction and cloud interaction. Generalized wearable intelligent device include a device with full features, a large size, and full or partial functions which may be implemented without relying on a smart phone, for example, a smart watch or smart glasses, as well as a device that is only focused on a certain application function and needs to be cooperated with other devices such as a smart phone, for example, a smart bracelet and a smart jewelry for various physical sign observations.

The network device may be a device for communicating with a mobile device, or may be an Access Point (AP) in the WLAN, or a Base Transceiver Station (BTS) in GSM or CDMA, or may be a NodeB (NB) in WCDMA, or an Evolutional Node B (eNB or eNodeB) in Long Term Evolution (LTE), or a relay station or an access point, or a vehicle-mounted device, a wearable device, a network device (gNB) in the NR network, or a network device in the future evolved PLMN network.

In the embodiments of the present disclosure, the network device provides services for a cell, and the terminal device communicates with the network device through transmission resources (e.g., frequency domain resources or spectrum resources) used by the cell. The cell may be a cell corresponding to the network device (e.g., a base station), the cell may belong to a macro base station, or may belong to a base station corresponding to a Small cell which here may include a Metro cell, a Micro cell, a Pico cell, a Femto cell, etc. These small cells have features of small coverage and low transmission power, and are suitable for providing high-speed data transmission services.

A DRX transmission mechanism is introduced under the consideration of the power saving of the terminal device, a discontinuous reception of a signal in the time domain is realized through semi-static configuration. When there is no data transmission, the reception of PDCCH can be stopped (the PDCCH blind detection will be stopped at this time) to reduce power consumption.

Figure 2:
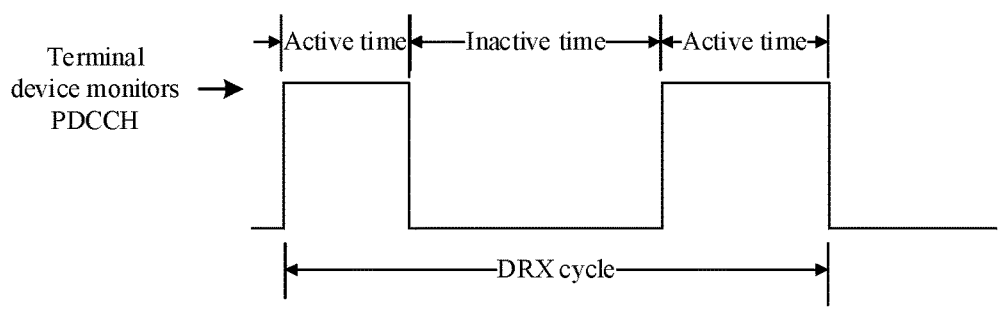
FIG. 2 is a schematic diagram illustrating a DRX cycle provided by an embodiment of the present application.

Specifically, a DRX cycle is configured for a terminal device in a radio resource control (RRC) connected state (RRC_CONNECTED). As shown in FIG. 2, the DRX cycle consists of an active time and an inactive time. During the active time, the terminal device monitors and receives the PDCCH; during the inactive time, the terminal device does not receive the PDCCH to reduce power consumption.

Continuous DRX cycles are divided in the time domain. During the DRX active time of each DRX cycle, the terminal device will detect the PDCCH according to the configured monitoring occasion (MO), and once the PDCCH is detected by the terminal device, an inactivity timer will further be enabled and refreshed.

In 5G and LTE evolution carrier aggregation (CA) or dual connection (DC) projects, an energy-saving dormancy state or dormancy mode is supported at present. In the dormancy mode, the terminal device can ignore the PDCCH of one carrier or greatly reduce the PDCCH monitoring on one carrier. Meanwhile, the terminal device only needs to maintain the reception of some basic channel measurement signals, such as uplink and downlink synchronization, and frequency calibration.

Figure 3:
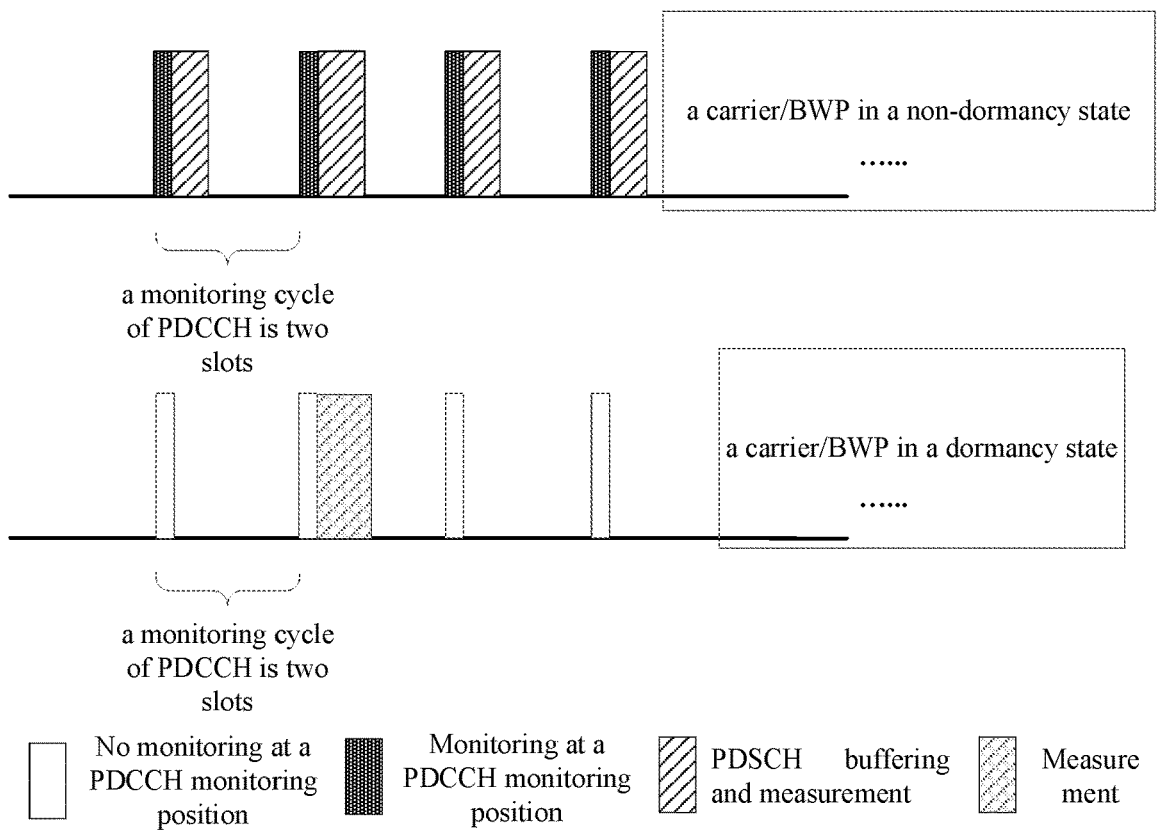
FIG. 3 is a schematic diagram illustrating comparison between a dormancy state and a non-dormancy state provided by an embodiment of the present application.

As shown in FIG. 3, most of the slots in a carrier or a bandwidth part (BWP) in the non-dormancy state have PDCCH monitoring, physical downlink shared channel (PDSCH) buffering, measurement, etc. For the carrier or BWP in the dormancy state, some slots only have measurement.

The network device can adjust the dormancy state on a carrier-by-carrier basis according to the current system throughput.

For example, a scheduling signaling on the carrier or the BWP can be used to indicate to switch to the dormancy state. However, if the carrier is already in the dormancy state, the terminal device cannot read the PDCCH. Therefore, the problem of how to switch back to the non-dormancy state has not been resolved.

Based on the above technical problems, the present application proposes a secondary carrier (scell) dormancy state indication solution. When the terminal device is in the DRX active time, a dormancy state or a non-dormancy state is distinctively indicated for different secondary carriers, so as to achieve better energy saving effect.

The following describes in detail the secondary carrier (scell) dormancy state indication solution designed by the present application for the above technical problems.

Figure 4:
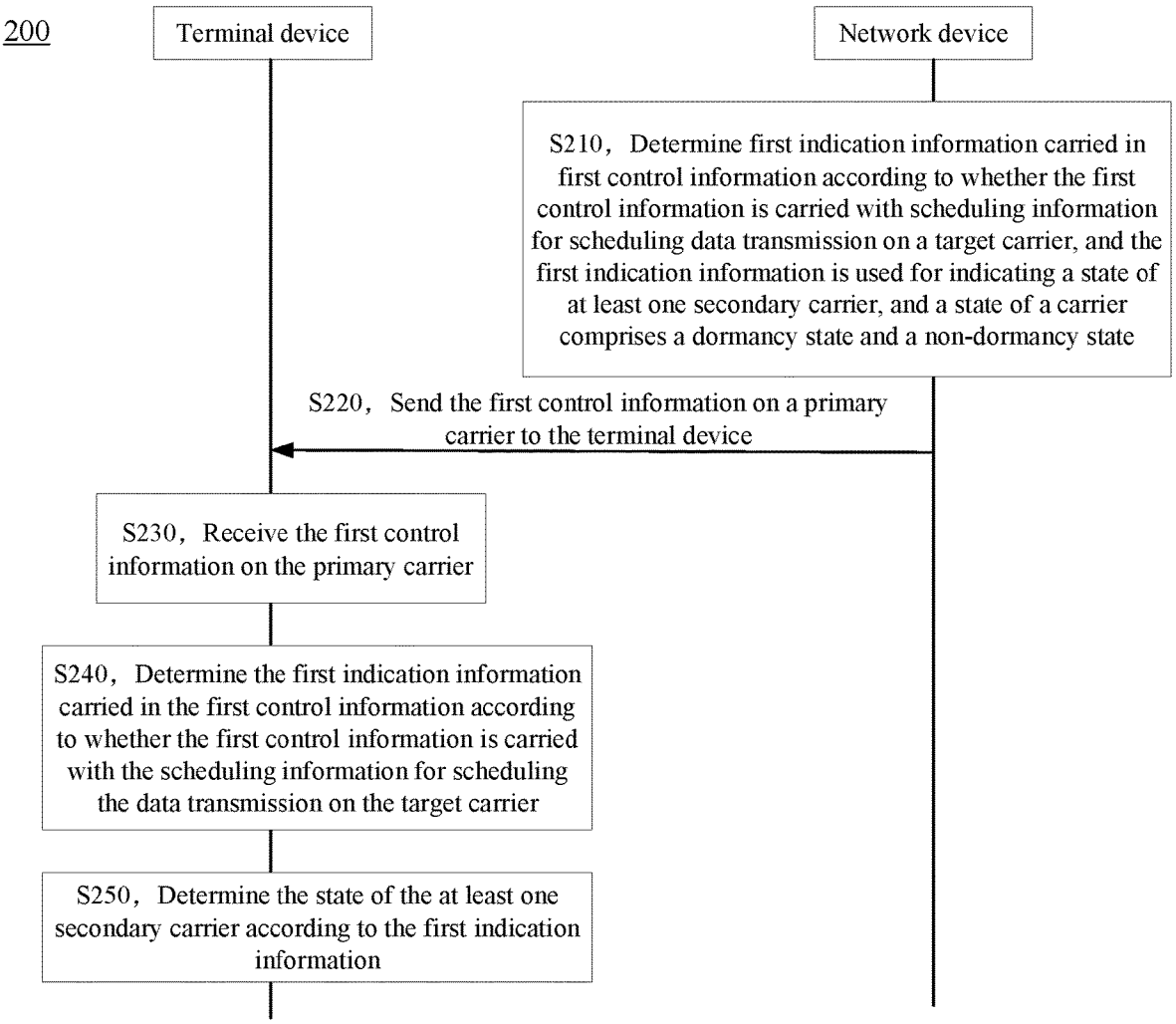
FIG. 4 is a schematic flowchart of a wireless communication method provided by an embodiment of the present application.

FIG. 4 is a schematic flowchart of a wireless communication method 200 according to an embodiment of the present application. As shown in FIG. 4, the method 200 may include some or all of the following contents.

In S210, a network device determines first indication information carried in first control information according to whether the first control information carries scheduling information for scheduling data transmission on a target carrier, and the first indication information is used for indicating a state of at least one secondary carrier, and states of a carrier include a dormancy state and a non-dormancy state.

In S220, the network device sends the first control information to a terminal device on a primary carrier.

In S230, the terminal device receives the first control information sent by the network device on the primary carrier.

In S240, the terminal device determines the first indication information carried in the first control information according to whether the first control information carries the scheduling information for scheduling the data transmission on the target carrier.

In S250, the terminal device determines a state of the at least one secondary carrier according to the first indication information.

In the embodiments of the present application, if the first control information carries the scheduling information for scheduling the data transmission on the target carrier, the network device determines that the first indication information is carried in the first control information in a form of indication format A; if the first control information does not carry the scheduling information for scheduling the data transmission on the target carrier, the network device determines that the first indication information is carried in the first control information in the form of indication format B.

It should be noted that, since the first control information is also used for scheduling the data transmission on the target carrier, the first indication information of the indication format A can indicate the state of the at least one secondary carrier according to a relatively large granularity; in contrast, the first indication information of the indication format B may use more bits in the first control information to elaborately indicate the state of each of the at least one secondary carrier.

In the embodiments of the present application, if the first control information carries the scheduling information for scheduling the data transmission on the target carrier, the first control information further includes but is not limited to at least one of the following:

a data frequency domain resource indication (for scheduling a physical downlink shared channel (PDSCH) or a physical uplink shared channel (PUSCH)), a data time domain resource indication (for scheduling the PDSCH or PUSCH), a modulation and coding scheme (MCS) indication, power control, channel state information (CSI) trigger information, and a BWP switching indication.

In one implementation, the at least one secondary carrier is a secondary carrier that has a certain correspondence with the primary carrier, and this correspondence may be agreed upon by a protocol or configured by the network device.

In one implementation, in the embodiments of the present application, the target carrier is one of the following:
the primary carrier, a secondary carrier in the dormancy state other than the at least one secondary carrier, and a secondary carrier in the non-dormancy state other than the at least one secondary carrier.

In the embodiments of the present application, if the target carrier is the secondary carrier in the dormancy state other than the at least one secondary carrier, the terminal device switches the state of the target carrier from the dormancy state to the non-dormancy state.

In one implementation, in the embodiments of the present application, the scheduling information can be used for scheduling uplink data transmission, and can also be used for scheduling downlink data transmission.

In some implementations, the scheduling information is used for scheduling the uplink data transmission.

In one implementation, the first control information is downlink control information (DCI) carried in the PDCCH.

In the embodiments of the present application, the terminal device is in the active period of the DRX cycle.

It should be understood that the active period of the DRX cycle may also be referred to as the active time of the DRX cycle.

In one implementation, when the terminal device enters the active period of the DRX cycle, the secondary carrier serving the terminal device automatically enters the dormancy state.

In one implementation, the above step S210 may specifically be:
if the first control information carries the scheduling information, the network device determines a dedicated field or multiple dedicated bits in the first control information as the first indication information; or
if the first control information does not carry the scheduling information, the network device determines multiple target bits in the first control information as the first indication information.

In one implementation, the above step S240 may specifically be:
if the first control information carries the scheduling information, the terminal device determines the dedicated field or the multiple dedicated bits in the first control information as the first indication information; or
if the first control information does not carry the scheduling information, the terminal device determines multiple target bits in the first control information as the first indication information.

In one implementation, the dedicated field or the multiple dedicated bits are pre-configured, or the dedicated field or the multiple dedicated bits are configured or indicated by the network device.

In one implementation, the dedicated field or the multiple dedicated bits indicate states of secondary carriers in at least one secondary carrier group, and the at least one secondary carrier belongs to the at least one secondary carrier group.

For example, the at least one secondary carrier group is pre-configured, or the at least one secondary carrier group is configured or indicated by the network device.

It should be noted that the dedicated field is a newly defined or newly configured field in the first control information, which does not conflict with an original field or bit in the first control information; similarly, the multiple dedicated bits are newly defined or newly configured bits in the first control information, which do not conflict with the original field or bit in the first control information.

In one implementation, the multiple target bits multiplex bits occupied by at least one piece of information in the first control information.

For example, the at least one piece of information includes at least one of the following:
frequency domain resource indication information, time domain resource indication information, power control domain, aperiodic measurement trigger information, MCS indication information, CSI trigger information, and BWP switching indication information.

In one implementation, the multiple target bits are pre-configured, or the multiple target bits are configured or indicated by the network device.

In one implementation, the multiple target bits respectively indicate a state of each of the at least one secondary carrier in a bitmap manner.

It should be noted that the multiple target bits redefine a meaning of the bit occupied by the at least one piece of information in the first control information.

For example, 15 bits in the first control information are used as the multiple target bits, and the 15 bits respectively indicate states of 15 secondary carriers.

For example, when a bit value is 1, it indicates that the state of the secondary carrier is the dormancy state, and when the bit value is 0, it indicates that the state of the secondary carrier is the non-dormancy state.

In one implementation, in the embodiments of the present application, the terminal device may determine whether the first control information carries the scheduling information.

For example, the terminal device determines whether the first control information carries the scheduling information according to data channel indication information in the first control information.

For example, the data channel indication information can be a 1-bit data channel indicator. When a value of the data channel indicator is 1, it is determined that the first control information carries the scheduling information, and when the value of the data channel indicator is 0, it is determined that the first control information does not carry the scheduling information.

As another example, the terminal device determines whether the first control information carries the scheduling information according to a value of at least one of frequency domain scheduling information, time domain scheduling information, the power control domain, and the aperiodic measurement trigger information.

In one implementation, in the embodiments of the present application, the network device may also determine whether the first control information carries the scheduling information.

For example, the network device determines whether the first control information carries the scheduling information according to data channel indication information in the first control information.

As another example, the network device determines whether the first control information carries the scheduling information according to the value of at least one of frequency domain scheduling information, time domain scheduling information, the power control domain, and the aperiodic measurement trigger information.

In one implementation, in the embodiments of the present application, the first indication information may indicate a state of each secondary carrier of the at least one secondary carrier, by activating a BWP that meets an indicated state in the each secondary carrier, and states of the BWP include a dormancy state and a non-dormancy state.

For example, the state of the secondary carrier may be indicated by the switching of one or more BWPs in this secondary carrier.

In one implementation, the state of the BWP is consistent with the state of the secondary carrier to which the BWP belongs.

For example, if the state of the BWP is the dormancy state, the state of the secondary carrier to which the BWP belongs is also the dormancy state. If the state of the BWP is the non-dormancy state, the state of the secondary carrier to which the BWP belongs is also the non-dormancy state.

In one implementation, the BWP in each secondary carrier is pre-configured, or the BWP in each secondary carrier is configured or indicated by the network device.

In one implementation, in the embodiments of the present application, the at least one secondary carrier includes a first secondary carrier, and
  if a state of the first secondary carrier is the dormancy state, the terminal device activates a BWP in the dormancy state in the first secondary carrier; or
  if the state of the first secondary carrier is the non-dormancy state, the terminal device activates the BWP in the first secondary carrier that was in the non-dormancy state last time.

In one implementation, there is only one BWP in the dormancy state in each secondary carrier.

In one implementation, in the embodiments of the present application, if the at least one secondary carrier includes a second secondary carrier, and a state of the second secondary carrier is the dormancy state, the terminal device performs at least one of the following operations:
  stopping monitoring part or all of physical downlink control channel (PDCCH) search space on the second secondary carrier;
  extending a monitoring cycle of the PDCCH search space on the second secondary carrier;
  performing at least one of CSI measurement, CSI reporting, uplink synchronization, and downlink synchronization on the second secondary carrier; and
  reducing the number of PDCCH blind detections or the number of channel estimation resources on the second secondary carrier.

It should be noted that the extended monitoring cycle of the PDCCH search space may be determined by a specific extension factor or a separate configuration. Similarly, the reduced number of PDCCH blind detections or the number of channel estimation resources may be determined by a reduction factor or the separate configuration.

Figure 5:
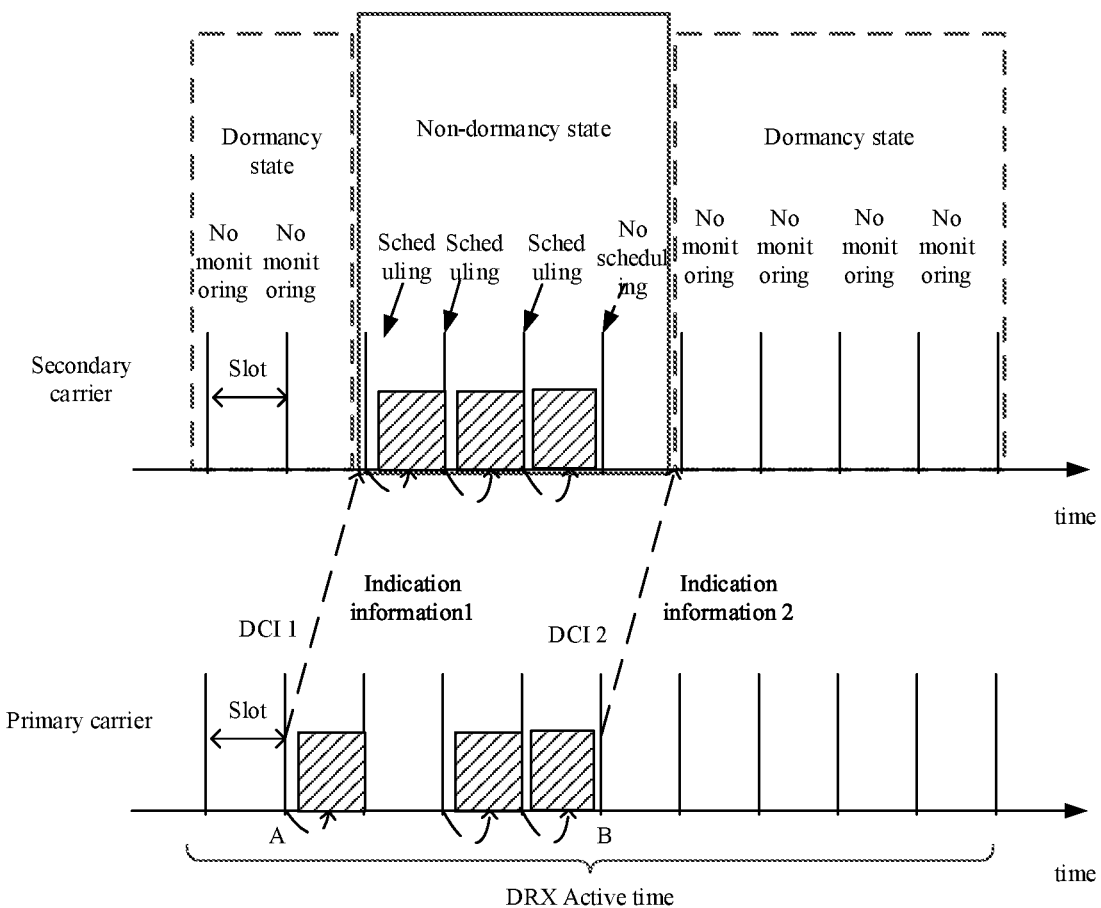
FIG. 5 is a schematic diagram illustrating indicating a state of a secondary carrier through a primary carrier provided by an embodiment of the present application.

In one implementation, as shown in FIG. 5, the terminal device is in the active time of the DRX cycle. The secondary carrier automatically enters the dormancy state when the terminal device enters the active time. The terminal device receives DCI 1 through the primary carrier at time A, the DCI 1 contains the scheduling information for scheduling the data transmission on the primary carrier, and indication information 1 in the DCI 1 indicates that the state of the secondary carrier is the non-dormancy state. In response to the indication information 1, the state of the secondary carrier is changed from the dormancy state to the non-dormancy state. Next, the terminal device receives DCI 2 through the primary carrier at time B. There is no scheduling information for scheduling the data transmission on the primary carrier in the DCI 2, and indication information 2 in the DCI 2 indicates that the state of the secondary carrier is the dormancy state. In response to the indication information 2, the state of the secondary carrier is changed from the non-dormancy state to the dormancy state.

In the embodiments of the present application, in a case where the state of the secondary carrier is the dormancy state, the PDCCH detection on this secondary carrier can be reduced. Of course, in a case where the state of the secondary carrier is the dormancy state, other power consumption operations, such as signal measurement, can also be further reduced. Furthermore, in the case where the state of the secondary carrier is the dormancy state, the number of receiving antennas (such as the maximum number of receiving antennas) of the terminal device can be reduced.

It should be noted that energy saving can be achieved when the secondary carrier is in the dormancy state.

In the embodiments of the present application, the first indication information is used for indicating the state of the at least one secondary carrier, for example, a certain secondary carrier being in the dormancy state or the non-dormancy state. Of course, it may be used for indicating the switching of some other energy-saving states of one or more secondary carriers.

It should be noted that in the existing solution, the energy-saving state of the carrier where the terminal device is located is switched through scheduling a control channel. However, the terminal device generally only needs to switch to the energy-saving state (dormancy state) when there is no data. In the embodiments of the present application, scheduling can sometimes be turned off, and more bits in the control channel are used to elaborately control the state of each secondary carrier to achieve energy saving. If there is data scheduling, the solution of the present application can also be used for scheduling, indicating the state of a group of secondary carriers according to a larger granularity, so as to achieve energy saving.

In the embodiments of the present application, the network device can more flexibly trigger the more refined energy-saving functions on the terminal side under the multi-secondary carrier configuration, and does not increase the control channel format.

In the embodiments of the present application, a dedicated energy-saving signal may not be added to indicate the energy-saving signal on each secondary carrier. Due to the large number of secondary carriers, the physical layer signaling overhead of the energy-saving signal dedicated to the secondary carrier will be very large. The solution of the present application does not require an additional bit field of the physical layer energy-saving signal, and can be compatible with the existing wake-up signal and DRX mechanism.

In the present application, the primary carrier can be used as an anchor point so that part or all of the secondary carriers enter the dormancy state or the non-dormancy state when the terminal device is in the DRX active period, and the response time is fast. Moreover, the network device can still use other methods, such as BWP dynamic signaling conversion, timers, etc., to quickly trigger the terminal device to enter the non-dormancy state with the high data rate (non-energy-saving state).

Figure 6:
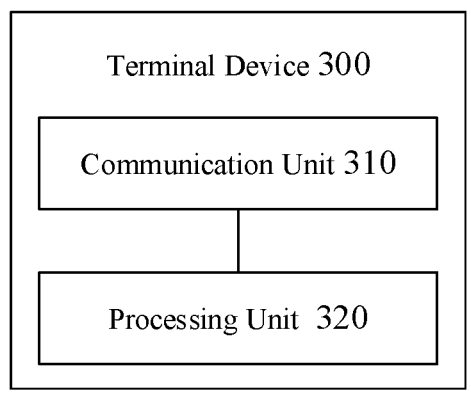
FIG. 6 is a schematic block diagram illustrating a terminal device provided by an embodiment of the present application.

FIG. 6 shows a schematic block diagram illustrating a terminal device 300 according to an embodiment of the present application. As shown in FIG. 6, the terminal device 300 includes:

a communication unit 310, configured to receive first control information on a primary carrier; and a processing unit 320, configured to determine first indication information carried in the first control information according to whether the first control information carries scheduling information for scheduling data transmission on a target carrier, and the first indication information is used for indicating a state of at least one secondary carrier, and states of a carrier include a dormancy state and a non-dormancy state.

The processing unit 320 is further configured to determine the state of the at least one secondary carrier according to the first indication information.

In one implementation, the target carrier is one of the following:

the primary carrier, a secondary carrier in the dormancy state other than the at least one secondary carrier, and a secondary carrier in the non-dormancy state other than the at least one secondary carrier.

In one implementation, if the target carrier is the secondary carrier in the dormancy state other than the at least one secondary carrier, the processing unit is further configured to switch a state of the target carrier from the dormancy state to the non-dormancy state.

In one implementation, the processing unit 320 is specifically configured to:

determine a dedicated field or multiple dedicated bits in the first control information as the first indication information if the first control information carries the scheduling information; or determine multiple target bits in the first control information as the first indication information if the first control information does not carry the scheduling information.

In one implementation, the dedicated field or the multiple dedicated bits are pre-configured, or the dedicated field or the multiple dedicated bits are configured or indicated by a network device.

In one implementation, the dedicated field or the multiple dedicated bits indicate states of secondary carriers in at least one secondary carrier group, and the at least one secondary carrier belongs to the at least one secondary carrier group.

In one implementation, the at least one secondary carrier group is pre-configured, or the at least one secondary carrier group is configured or indicated by the network device.

In one implementation, the multiple target bits multiplex bits occupied by at least one piece of information among the first control information.

In one implementation, the at least one piece of information includes at least one of the following:

frequency domain resource indication information, time domain resource indication information, power control domain, aperiodic measurement trigger information, MCS indication information, CSI trigger information, and BWP switching indication information.

In one implementation, the multiple target bits are pre-configured, or the multiple target bits are configured or indicated by the network device.

In one implementation, the multiple target bits indicate a state of each of the at least one secondary carrier in a bitmap manner, respectively.

In one implementation, the processing unit 320 is further configured to determine whether the first control information carries the scheduling information.

In one implementation, the processing unit 320 is specifically configured to:

determine whether the first control information carries the scheduling information according to data channel indication information in the first control information.

In one implementation, the processing unit 320 is specifically configured to:

determine whether the first control information carries the scheduling information according to a value of at least one of frequency domain scheduling information, time domain scheduling information, the power control domain, and the aperiodic measurement trigger information.

In one implementation, the first indication information indicates a state of each secondary carrier of the at least one secondary carrier, by activating a BWP that meets an indicated state in the each secondary carrier, and states of the BWP include a dormancy state and a non-dormancy state.

In one implementation, the state of the BWP is consistent with a state of a secondary carrier to which the BWP belongs.

In one implementation, the BWP in each secondary carrier is pre-configured, or the BWP in each secondary carrier is configured or indicated by the network device.

In one implementation, the at least one secondary carrier includes a first secondary carrier, and the processing unit 320 is further configured to:

activate a BWP in the dormancy state in the first secondary carrier if a state of the first secondary carrier is the dormancy state; or activate a BWP in the first secondary carrier that was in the non-dormancy state last time if the state of the first secondary carrier is the non-dormancy state.

In one implementation, there is only one BWP in the dormancy state in each secondary carrier.

In one implementation, if the at least one secondary carrier includes a second secondary carrier, and a state of the second secondary carrier is the dormancy state, the processing unit 320 performs at least one of the following operations:

stopping monitoring part or all of physical downlink control channel (PDCCH) search space on the second secondary carrier;

extending a monitoring cycle of the PDCCH search space on the second secondary carrier;

performing at least one of CSI measurement, CSI reporting, uplink synchronization, and downlink synchronization on the second secondary carrier; and reducing the number of PDCCH blind detections or the number of channel estimation resources on the second secondary carrier.

In one implementation, the scheduling information is used for scheduling uplink data transmission.

In one implementation, the first control information is DCI carried in the PDCCH.

In one implementation, the terminal device is in the active period of the DRX cycle.

It should be understood that the terminal device 300 according to the embodiments of the present application may correspond to the terminal device in the method embodiments of the present application, and the above and other operations and/or functions of each unit in the terminal device 300 are respectively for implementing the corresponding processes of the terminal device in the method 200 as shown in FIG. 4. For the sake of brevity, repeated descriptions are omitted here.

Figure 7:
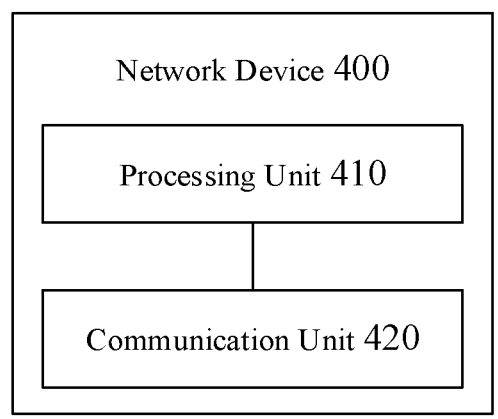
FIG. 7 is a schematic block diagram illustrating a network device provided by an embodiment of the present application.

FIG. 7 shows a schematic block diagram illustrating a network device 400 according to an embodiment of the present application. As shown in FIG. 7, the network device 400 includes:

- a processing unit 410, configured to determine first indication information carried in first control information according to whether the first control information carries scheduling information for scheduling data transmission on a target carrier, and the first indication information is used for indicating a state of at least one secondary carrier, and states of a carrier include a dormancy state and a non-dormancy state; and
- a communication unit 420, configured to send the first control information on a primary carrier.

In one implementation, the target carrier is one of the following:

the primary carrier, a secondary carrier in the dormancy state other than the at least one secondary carrier, and a secondary carrier in the non-dormancy state other than the at least one secondary carrier.

In one implementation, if the target carrier is the secondary carrier in the dormancy state other than the at least one secondary carrier, the scheduling information is further used for triggering a peer device to switch a state of the target carrier from the dormancy state to the non-dormancy state.

In one implementation, the processing unit 410 is specifically configured to:

determine a dedicated field or multiple dedicated bits in the first control information as the first indication information if the first control information carries the scheduling information; or determine multiple target bits in the first control information as the first indication information if the first control information does not carry the scheduling information.

In one implementation, the dedicated field or the multiple dedicated bits are configured or indicated by the network device.

In one implementation, the dedicated field or the multiple dedicated bits indicate states of secondary carriers in at least one secondary carrier group, and the at least one secondary carrier belongs to the at least one secondary carrier group.

In one implementation, the at least one secondary carrier group is configured or indicated by the network device.

In one implementation, the multiple target bits multiplex bits occupied by at least one piece of information among the first control information.

In one implementation, the at least one piece of information includes at least one of the following:

frequency domain resource indication information, time domain resource indication information, power control domain, aperiodic measurement trigger information, MCS indication information, CSI trigger information, and BWP switching indication information.

In one implementation, the multiple target bits are configured or indicated by the network device.

In one implementation, the multiple target bits indicate a state of each of the at least one secondary carrier in a bitmap manner, respectively.

In one implementation, the processing unit 410 is further configured to determine whether the first control information carries the scheduling information.

In one implementation, the processing unit 410 is specifically configured to:

determine whether the first control information carries the scheduling information according to data channel indication information in the first control information.

In one implementation, the processing unit 410 is specifically configured to:

determine whether the first control information carries the scheduling information according to a value of at least one of frequency domain scheduling information, time domain scheduling information, the power control domain, and the aperiodic measurement trigger information.

In one implementation, the first indication information indicates a state of each secondary carrier of the at least one secondary carrier, by activating a BWP that meets an indicated state in the each secondary carrier, and states of the BWP include a dormancy state and a non-dormancy state.

In one implementation, the state of the BWP is consistent with a state of a secondary carrier to which the BWP belongs.

In one implementation, the BWP in each secondary carrier is pre-configured, or the BWP in each secondary carrier is configured or indicated by the network device.

In one implementation, there is only one BWP in the dormancy state in each secondary carrier.

In one implementation, the scheduling information is used for scheduling uplink data transmission.

In one implementation, the first control information is DCI carried in the PDCCH.

It should be understood that the network device 400 according to the embodiments of the present application may correspond to the network device in the method embodiments of the present application, and the above and other operations and/or functions of each unit in the network device 400 are respectively for implementing the corresponding processes of the network device in the method 200 shown in FIG. 4. For the sake of brevity, details will not be repeated here.

Figure 8:
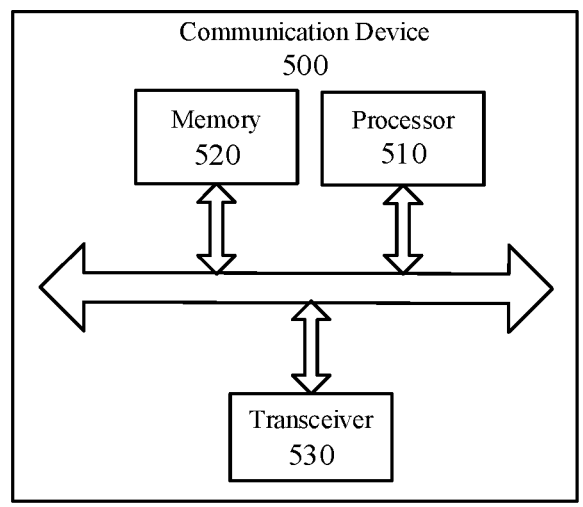
FIG. 8 is a schematic block diagram illustrating a communication device provided by an embodiment of the present application.

FIG. 8 is a schematic structural diagram illustrating a communication device 500 according to an embodiment of the present application. The communication device 500 shown in FIG. 8 includes a processor 510. The processor 510 may invoke a computer program from a memory and run the computer program, to implement the method in the embodiments of the present application.

In one implementation, as shown in FIG. 8, the communication device 500 may further include a memory 520. The processor 510 may invoke the computer program from the memory 520 and run the computer program, to implement the method in the embodiments of the present application.

The memory 520 may be a component independent of the processor 510, or may be integrated into the processor 510.

In one implementation, as shown in FIG. 8, the communication device 500 may further include a transceiver 530. The processor 510 may control the transceiver 530 to communicate with another device, and specifically, the transceiver 530 may transmit information or data to another device, or receive information or data transmitted by another device.

The transceiver 530 may include a transmitter and a receiver. The transceiver 530 may further include an antenna. There may be one or more antennas.

In one implementation, the communication device 500 may be the network device or the base station in the embodiments of the present application, and the communication device 500 can implement corresponding procedures implemented by the network device or the base station in various methods in the embodiments of the present application. For brevity, details are not described herein again.

In one implementation, the communication device 500 may be the mobile terminal/terminal in the embodiments of the present application, and the communication device 500 can implement corresponding procedures implemented by the mobile terminal/terminal device in various methods in the embodiments of the present application. For brevity, details are not described herein again.

Figure 9:
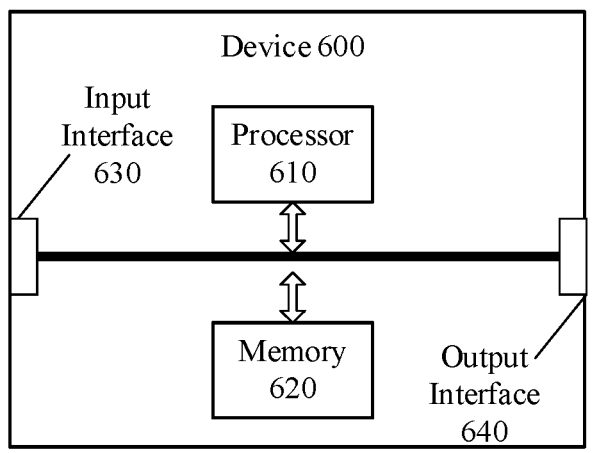
FIG. 9 is a schematic block diagram illustrating a device provided by an embodiment of the present application.

FIG. 9 is a schematic structural diagram illustrating a device according to an embodiment of the present application. The device 600 shown in FIG. 9 includes a processor 610. The processor 610 may invoke a computer program from a memory and run the computer program, to implement the method in the embodiments of the present application.

In one implementation, as shown in FIG. 9, the device 600 may further include a memory 620. The processor 610 may invoke the computer program from the memory 620 and run the computer program, to implement the method in the embodiments of the present application.

The memory 620 may be a component independent of the processor 610, or may be integrated into the processor 610.

In one implementation, the device 600 may further include an input interface 630. The processor 610 may control the input interface 630 to communicate with another device or chip, and specifically, the input interface 630 may obtain information or data transmitted by another device or chip.

In one implementation, the device 600 may further include an output interface 640. The processor 610 may control the output interface 640 to communicate with another device or chip, and specifically, the output interface 640 may output information or data to another device or chip In one implementation, the device may be applied in the network device or the base station according to embodiments of the present application, and the device can implement corresponding procedures implemented by the network device or the base station in various methods in the embodiments of the present application. For brevity, details are not described herein again.

In one implementation, the device may be applied to the mobile terminal/terminal device in the embodiments of the present application, and the device can implement corresponding procedures implemented by the mobile terminal/terminal device in various methods in the embodiments of the present application. For brevity, details are not described herein again.

In one implementation, the device mentioned in the embodiments of the present application may also be a chip, for example, a system-level chip, a system chip, a chip system, a system on chip, or the like.

Figure 10:
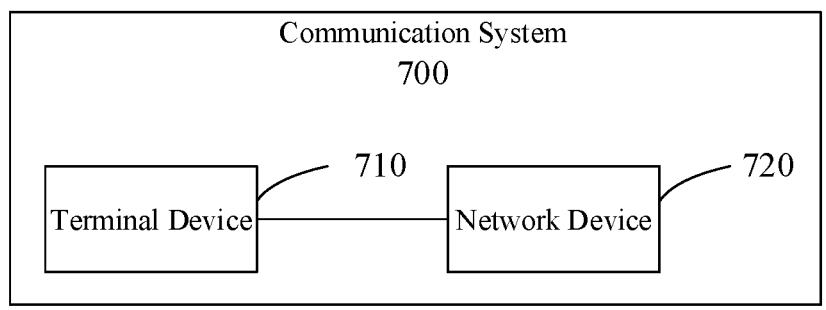
FIG. 10 is a schematic block diagram illustrating a communication system provided by an embodiment of the present application.

FIG. 10 is a schematic structural diagram illustrating a communication system 700 according to an embodiment of the present application. The communication system 700 shown in FIG. 10 includes a terminal device 710 and a network device 720.

The terminal device 710 can implement corresponding functions implemented by the terminal device in the foregoing method and the network device 720 can implement corresponding functions implemented by the network device or the base station in the foregoing method. For brevity, details are not described herein again.

It should be understood that, the processor of the embodiments of the present application may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that, the memory in the embodiments of the present application may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchlink dynamic random access memory (SLDRAM), and a direct rambus random access memory (DRRAM). It should be noted that, the memory of the system and the method described in this embodiment of the present application is intended to include but is not limited to these memories and any other suitable type of memory.

It should be understood that, the memory is an example but is not intended for limitation. For example, the memory in the embodiments of the present application may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this embodiment of the present application is intended to include but is not limited to these memories and any other suitable type of memory.

An embodiment of the present application further provides a computer readable storage medium. The computer readable storage medium is configured to store a computer program.

In one implementation, the computer readable storage medium may be applied to the network device or the base station in the embodiments of the present application, and the computer program enables a computer to execute a corresponding procedure implemented by the network device or the base station in the methods of the embodiments of the present application. For brevity, details are not described herein again.

In one implementation, the computer readable storage medium may be applied to the mobile terminal/terminal device in the embodiments of the present application, and the computer program enables the computer to execute a corresponding procedure implemented by the mobile terminal/terminal device in the methods of the embodiments of the present application. For brevity, details are not described herein again.

The present application further provides a computer program product. The computer program product includes a computer program instruction.

In one implementation, the computer program product may be applied to the network device or the base station in the embodiments of the present application, and the computer program instruction enables the computer to execute a corresponding procedure implemented by the network device or the base station in the methods of the embodiments of the present application. For brevity, details are not described herein again.

In one implementation, the computer program product may be applied to the mobile terminal/terminal device in the embodiments of the present application, and the computer program instruction enables the computer to execute a corresponding procedure implemented by the mobile terminal/terminal device in the methods of the embodiments of the present application. For brevity, details are not described herein again.

The present application further provides a computer program.

In one implementation, the computer program may be applied to the network device or the base station in the embodiments of the present application, and when run on a computer, the computer program instruction enables the computer to execute a corresponding procedure implemented by the network device or the base station in the methods of the embodiments of the present application. For brevity, details are not described herein again.

In one implementation, the computer program may be applied to the mobile terminal/terminal device in the embodiments of the present application, and when run on a computer, the computer program instruction enables the computer to execute a corresponding procedure implemented by the mobile terminal/terminal device in the methods of the embodiments of the present application. For brevity, details are not described herein again.

Those skilled in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present application, it should be understood that the disclosed system, apparatus, and method may be implemented in other manners.

For example, the apparatus embodiments described above are merely examples.

For example, the unit division is merely logical function division, and there may be other division manners in actual implementation.

For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present application, but the protection scope of the present application is not limited thereto. Changes or replacements readily figured out by any person skilled in the art within the technical scope disclosed in the present application shall be covered by the protection scope of the present application. Therefore, the protection scope of the present application shall be subject to the protection scope of the claims.

What is claimed is:

1. A wireless communication method, comprising:
  receiving, by a terminal device, first control information on a primary carrier;
  determining, by the terminal device, first indication information carried in the first control information according to whether the first control information carries scheduling information for scheduling data transmission on a target carrier, wherein the first indication information is used for indicating a state of at least one secondary carrier, and states of a carrier comprise a dormancy state and a non-dormancy state; and
  determining, by the terminal device, the state of the at least one secondary carrier according to the first indication information,
  wherein:
  if the first control information carries the scheduling information for scheduling data transmission on the target carrier, the first indication information is carried in the first control information in a form of first indication format; and if the first control information does not carry the scheduling information for scheduling data transmission on the target carrier, the first indication information is carried in the first control information in a form of second indication format, wherein the method further comprises:

determining, by the terminal device, whether the first control information carries the scheduling information according to a value of frequency domain scheduling information, wherein:

if the first control information carries the scheduling information for scheduling data transmission on the target carrier, the first indication information is a dedicated field of the first control information;

if the first control information does not carry the scheduling information for scheduling data transmission on the target carrier, the first indication information is multiple target bits of the first control information, and the multiple target bits are 15 bits in the first control information, the 15 bits correspondingly indicate states of 15 secondary carriers.

2. The method according to claim 1, wherein the first indication information indicates a state of each secondary carrier of the at least one secondary carrier, by activating a bandwidth part (BWP) that meets an indicated state in the each secondary carrier, wherein states of the BWP comprise a dormancy state and a non-dormancy state.

3. The method according to claim 1, wherein an indication granularity of the first indication format is larger than an indication granularity of the second indication format.

4. A wireless communication method, comprising:

determining, by a network device, first indication information carried in first control information according to whether the first control information carries scheduling information for scheduling data transmission on a target carrier, wherein the first indication information is used for indicating a state of at least one secondary carrier, and states of a carrier comprise a dormancy state and a non-dormancy state; and sending, by the network device, the first control information on a primary carrier, wherein:

if the first control information carries the scheduling information for scheduling data transmission on the target carrier, the first indication information is carried in the first control information in a form of first indication format; and if the first control information does not carry the scheduling information for scheduling data transmission on the target carrier, the first indication information is carried in the first control information in a form of second indication format, wherein the method further comprises:

determining, by the network device, whether the first control information carries the scheduling information according to a value of frequency domain scheduling information, wherein:

if the first control information carries the scheduling information for scheduling data transmission on the target carrier, the first indication information is a dedicated field of the first control information;

if the first control information does not carry the scheduling information for scheduling data transmission on the target carrier, the first indication information is multiple target bits of the first control information, and the multiple target bits are 15 bits in the first control information, the 15 bits correspondingly indicate states of 15 secondary carriers.

5. The method according to claim 4, wherein an indication granularity of the first indication format is larger than an indication granularity of the second indication format.

6. A terminal device, comprising a processor and a memory, wherein the memory is configured to store a computer program, and the processor is configured to call the computer program stored in the memory and run the computer program, to execute operations of:

receiving first control information on a primary carrier; and determining first indication information carried in the first control information according to whether the first control information carries scheduling information for scheduling data transmission on a target carrier, wherein the first indication information is used for indicating a state of at least one secondary carrier, and states of a carrier comprise a dormancy state and a non-dormancy state;

wherein the processor is further configured to determine the state of the at least one secondary carrier according to the first indication information, wherein:

if the first control information carries the scheduling information for scheduling data transmission on the target carrier, the first indication information is carried in the first control information in a form of first indication format; and if the first control information does not carry the scheduling information for scheduling data transmission on the target carrier, the first indication information is carried in the first control information in a form of second indication format, wherein the processor is further configured to determine whether the first control information carries the scheduling information according to a value of frequency domain scheduling information, wherein:

if the first control information carries the scheduling information for scheduling data transmission on the target carrier, the first indication information is a dedicated field of the first control information;

if the first control information does not carry the scheduling information for scheduling data transmission on the target carrier, the first indication information is multiple target bits of the first control information, and the multiple target bits are 15 bits in the first control information, the 15 bits correspondingly indicate states of 15 secondary carriers.

7. The terminal device according to claim 6, wherein the first indication information indicates a state of each secondary carrier of the at least one secondary carrier, by activating a bandwidth part (BWP) that meets an indicated state in the each secondary carrier, wherein states of the BWP comprise a dormancy state and a non-dormancy state.

8. The terminal device according to claim 7, wherein the BWP in each secondary carrier is pre-configured, or the BWP in each secondary carrier is configured or indicated by a network device.

9. The terminal device according to claim 7, wherein the at least one secondary carrier comprises a first secondary carrier, and the processor is further configured to:

activate a BWP in the dormancy state in the first secondary carrier if a state of the first secondary carrier is the dormancy state; or activate a BWP in the first secondary carrier that was in the non-dormancy state last time if the state of the first secondary carrier is the non-dormancy state.

10. A network device, comprising a processor and a memory, wherein the memory is configured to store a computer program, and the processor is configured to call the computer program stored in the memory and run the computer program, to execute operations of:

determining first indication information carried in first control information according to whether the first control information carries scheduling information for scheduling data transmission on a target carrier, wherein the first indication information is used for indicating a state of at least one secondary carrier, and states of a carrier comprise a dormancy state and a non-dormancy state; and sending the first control information on a primary carrier, wherein:

if the first control information carries the scheduling information for scheduling data transmission on the target carrier, the first indication information is carried in the first control information in a form of first indication format; and if the first control information does not carry the scheduling information for scheduling data transmission on the target carrier, the first indication information is carried in the first control information in a form of second indication format, wherein the processor is further configured to determine whether the first control information carries the scheduling information according to a value of frequency domain scheduling information, wherein:

if the first control information carries the scheduling information for scheduling data transmission on the target carrier, the first indication information is a dedicated field of the first control information;

if the first control information does not carry the scheduling information for scheduling data transmission on the target carrier, the first indication information is multiple target bits of the first control information, and the multiple target bits are 15 bits in the first control information, the 15 bits correspondingly indicate states of 15 secondary carriers.

11. The network device according to claim 10, wherein the first indication information indicates a state of each secondary carrier of the at least one secondary carrier, by activating a bandwidth part (BWP) that meets an indicated state in the each secondary carrier, wherein states of the BWP comprise a dormancy state and a non-dormancy state.

* * * * *